United States Patent [19]
Seip

[11] 3,829,706
[45] Aug. 13, 1974

[54] SWITCHING ARRANGEMENT FOR REMOTE CONTROLLED ELECTRICAL LOADS

[75] Inventor: Günter Seip, Erlangen, Germany

[73] Assignee: Siemens Aktiengesellschaft, Munchen, Germany

[22] Filed: Feb. 1, 1973

[21] Appl. No.: 328,673

[30] Foreign Application Priority Data
Feb. 5, 1972 Germany............................ 2205414
June 30, 1972 Germany............................ 2232170

[52] U.S. Cl................................. 307/147, 317/137
[51] Int. Cl. ............................................ H01h 47/22
[58] Field of Search ........... 307/143, 147, 149, 112, 307/134, 17, 92; 317/137

[56] References Cited
UNITED STATES PATENTS
3,700,972  10/1972  Bates .................................. 317/137

Primary Examiner—Herman J. Hohauser
Attorney, Agent, or Firm—Kenyon & Kenyon Reilly Carr & Chapin

[57] ABSTRACT

An improved load control system for lighting fixtures and the like which allows the wires leading to the control switch, or command transmitter, and the transmitter itself to be extremely thin and thus to be cemented to the outside of a wall avoiding time consuming and costly behind the wall installation. The command transmitter operates at a voltage of less than four volts which is coupled over strip lines to a converter module which increases the voltage to in the order of 24 volts to operate line voltage switching apparatus. The converter and switching apparatus are built into a single unit which may be installed directly in a distribution box.

19 Claims, 11 Drawing Figures

SWITCHING ARRANGEMENT FOR REMOTE CONTROLLED ELECTRICAL LOADS

BACKGROUND OF THE INVENTION

This invention relates to the control of electrical loads in general and more particularly to an improved low voltage control system particularly useful in controlling lighting fixtures.

The conventional method of arranging lighting circuits in residential, office and industrial installations is to switch the power being supplied to the lighting fixture through a wall mounted switch having the required voltage and current ratings. The switches are generally in a mounting box which is recessed in the wall. Similarly, wires are run within the wall, behind the plaster, between a distribution point, the wall switch and the lighting fixture. Such installations are time consuming and expensive. If the walls being worked upon are cement walls, considerable chiseling must be done in order to form ducts and recesses for the wiring and the various fixtures. Even where frame construction is used, considerable time and money is spent in installing the necessary boxes and wiring. Installations must be done with a great deal of care to take into account the shock and fire hazards which result if these high voltage circuits are not properly installed. Pre-installation of boxes and/or wiring when constructing portions for prefabricated houses adds considerably to their cost. In addition, upon assembly, further wiring must be done to complete the installation. Further problems arise in office buildings where the space may be subdivided in different ways at different times. To provide the necessary flexibility, switches are often mounted on the walls or at posts which are remote from the area at which the lighting is to be controlled. In addition, spare boxes and lines are often installed to provide for any changes which occur later on. These various factors add considerably to the cost of the wiring installation. Even if the wiring is being done in a residence, where there is little chance that the installation will change, large amounts of wire are used in making the runs between the distribution boxes, the lighting fixtures and the switches. In addition each of the switch boxes must be separately wired which adds to the overall expense.

Various systems have been devised to overcome some of these problems. For example, under floor installations system have been used and railing and window ducts containing busses have been installed. These supply some of the need flexibility but also are quite costly. Another system which has been used is one in which a lower voltage, for example, about 24 volts, is used in a control circuit with the low voltages running to the wall switches and controlling relays which then switch the high voltage to the lighting fixtures. Although such a system reduces the amount of high voltage wiring, installation time is not considerably reduced since these wires are generally installed behind the wall as in the conventional installation. The size of the controls, the wire size, and the possibility of shocks, which may be dangerous even at this voltage, make this type of installation necessary. This type system does however, offer the advantage of the ability to control from a number of locations and of reduced shock and fire hazards.

Thus, it can be seen that there is a need for a simple type of wiring control which does not require behind the wall wiring, thus permitting easy installation and flexibility for change.

SUMMARY OF THE INVENTION

The apparatus of the present invention fills the need for a control system which is safe and which can be mounted external to the wall. The system can be divided into three basic sections each operating at a different voltage level. The control signal to switch the light on or off or switch over to some other function is at a low voltage and power level, for example, 4 volts at less than 1 watt power. These low voltage signals are provided to an amplifier-converter module which is located either at the lighting fixture or in the junction box from which the fixture obtains its power. In the converter module, the low voltage is converted or amplified to a voltage of 24 volts or less which may be used to control an impulse switching device, e.g. a latching relay or a triac. This intermediate voltage, i.e. at 24 volts, is provided to the impulse switching device which switches the high voltage load at, for example, 115 volts. This switching mechanism may be located in the same general area as the converter module and preferably will be made as an integral part thereof. Because the voltages which are being switched by the operator in turning on and off the lights are very low, essentially flat transmitting or switching devices and strip lines of thin wire, i.e. flat cables, may be used to transmit the switching commands to the converter module. These flat cables and flat switching devices can be constructed with adhesive backing so that they may be fastened to a wall wherever desired and conveniently run along the wall to the desired location. Various examples of transmitters are given, for example, mechanical to electrical converter devices, capacitive and conductive switching devices and conventional contact type switches. In addition, controls such as dimming controls for lights may be installed in the same manner, using, for example, a flat sliding potentiometer.

The system thus offers the advantages of being less expensive to install, more flexible and safer. The installation may be made in both new and old buildings and may easily be rearranged when required. The low voltage throughout a good portion of the system reduces shock and fire hazards. The only portions of the system operating at high voltage, are the lines between the fixtures and the distribution boxes. This simplifies the design and requires less change as conditions change in the building. The reduction in gauge guage lines between switches and fixtures is greatly reduced, particularly in installations where there is a requirement to be able to switch lights on and off at many points which formerly would require multiple runs of wire capable of carrying the load current. By proper design, the long runs may be made with the control lines, with the runs between the distribution box and the fixtures themselves being considerably shortened.

DETAILED DESCRIPTION OF THE PREFERRED EMBODIMENT

Figure 1:
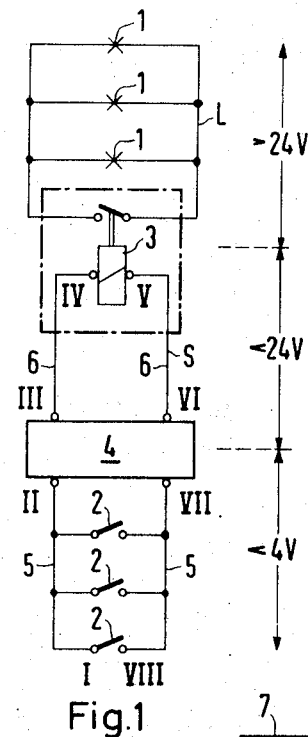
FIG. 1 is a block-schematic diagram of a preferred embodiment of the present invention.

FIG. 1 is a block-circuit diagram illustrating the basic elements of the present invention. A plurality of loads 1 in parallel are controlled by any one of the switches 2 through a converter 4, and a switching device 3. Although, in most cases, the loads 1 will comprise lighting fixtures, the system may be equally well used to control other electrical loads such as heating equipment or motors. The switches 2, which can be more generally designated as control transmitters, may comprise switches as shown or may also be mechanical to electrical energy converters such as Hall effect transducers, field plates or piezoelectric crystals and may also be inductive or capacitive transmitters. The converter 4, will supply on a line II, for example, a voltage of less than 4 volts from a power supply to be described below. Operation of any of the switches 2 will cause this voltage to be switched back to the converter 4, where it will be converted and/or amplified to a voltage somewhere in the vicinity of 24 volts and provided over lines 6 from terminals III and VI to the terminals IV and V of a switching device 3 which, in response thereto, will complete the high voltage circuit, e.g. 115 volts, to the loads 1.

Figure 2:
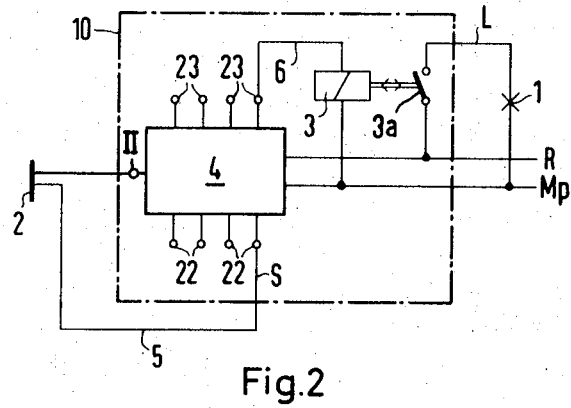
FIG. 2 is a block diagram showing the switching arrangement for a single switch and control circuit of the system of FIG. 1.
Figure 3:
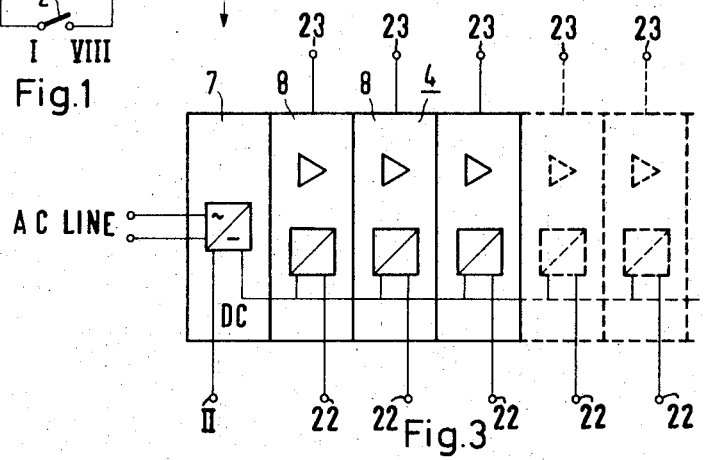
FIG. 3 is a block diagram illustrating the arrangement of the converter of FIGS. 1 and 2.
Figure 4:
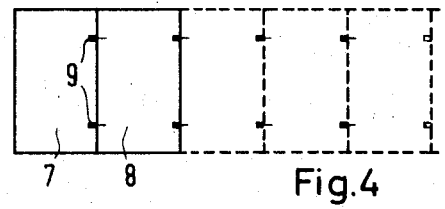
FIG. 4 is a block diagram illustrating the connection of a plurality of the converters of FIG. 3.

FIGS. 2 and 3 illustrate in slightly more detail the operation of the system. The converter 4 of FIGS. 1 and 2 is shown in block diagram on FIG. 3. The converter 4 will contain a power supply 7 having as an input the AC line voltage and providing a DC output at less than 4 volts. In addition to the power supply 7, there will be one or more amplifier sections 8, one being provided for each load to be controlled by the system. Each of the amplifier sections 8 will have one input from one side of the DC output of power supply 7, and another input labeled 22, from the respective command transmitters for switches 2. The other output of the power supply 7, corresponding to terminal II on FIG. 1, will be provided to each of the switches in the system. This low voltage on line II will be switched through the transmitting device back to one of the lines 22, from line 22 it will become the input to one of the amplifiers sections 8 where it will be converted and/or amplified and provided as an output at a voltage in the vicinity of 24 volts on a corresponding output line 23. The separate modules of FIG. 3 may be designed so that they may plug together to form a single unit as shown on FIG. 4. As shown thereon, each of the modules 7 and 8 will be provided with plug connectors for combining them into a single unit. They may also be connected using push fastener connections to obtain the necessary electrical and/or mechanical coupling. Discrete components and/or available integrated circuits may be used in designing the power supply 7 and the amplifier modules 8 in a manner well known in the art.

It is additionally helpful to combine the converter 4 and the switching mechanism 3 into a single package 10 as shown on FIG. 2. As shown thereon, the low voltage from terminal II is provided to the command transmitter 2, which, when activated, will return the signal over line 5 to an input terminal 22 of converter 4. As described above, this will cause a corresponding amplifier output from terminal 23, at a high voltage, on line 6 to activate switching device 3. Switching device 3 may comprise a latching type relay operating the contacts 3a in a manner well known in the art using commercially available components such as those presently used in low voltage control circuits. However, it will preferably be a solid state switching device with a triac used to switch the AC power to the load 1, i.e. the switch contacts shown would be replaced by a triac. For most efficient use of the system, the package 10 should be constructed so that it may be mounted directly in a distribution box and be plugged into the voltage busses R and MP therein from which the power is provided to the load 1. In this way, it may be inserted into the distribution box much in the same way as a circuit breaker and would have dimensions and connections corresponding to those of a circuit breaker.

Figure 5:
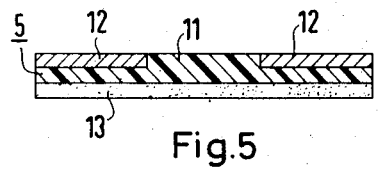
FIG. 5 is a first embodiment of a flat strip conductor.
Figure 6:
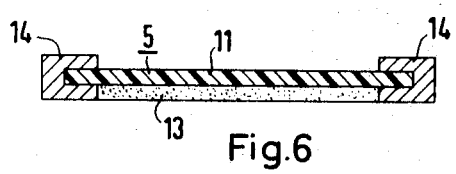
FIG. 6 is a cross section of a second flat conductor.
Figure 7:
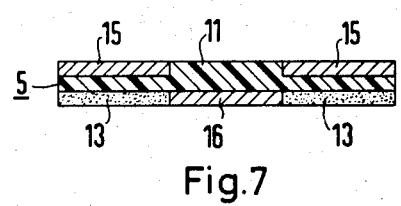
FIG. 7 is a cross section showing a third possible flat conductor.

Because of the fact that the switch or command transmitter 2 is only required to switch very low voltages at low power levels, both the switch and the wiring between the switch and the converter 4 may be made extremely thin. Examples of construction of the strip lines which may be used in coupling the switches or command transmitters 2 to the converter 4 or shown on FIGS. 5, 6 and 7. Such strip lines have been used rather extensivly in certain electronic applications and are well known and commercially available. FIG. 5 shows a strip line indicated generally as 5 comprising a plastic ribbon 11 onto which two longitudinal strips of a conductive layer are arranged. On the back of the strip is applied an adhesive 13. Prior to installation, the adhesive 13 would be covered with a backing strip which is removed to expose the adhesive when mounting the flat conductor. Another arrangement is shown in FIG. 6. In this case, the strip line 5 has its two conductive sections 14, mounted to the edges of the plastic insulating strip 11. As before an adhesive backing 13 is applied to permit securing the strip line to a wall. A third arrangement is shown in FIG. 7. In this arrangement, there are three conductive strips, one on the top of each side, labeled 15 and a third strip on the bottom labeled 16. This arrangement permits controlling two different circuits from a single location. As before, adhesive material 13 is provided on the back of the strip. It should be noted that these strips shown are only shown as examples, and any other arrangements may be used; either specially designed or commercially available strips may be used depending on the particular system requirements. It should also be noted that the ections of the strip may be colored with different colors to designate different circuits. This is particularly true, for example, in the case illustrated by FIG. 7, where two circuits may be controlled from one location. A further note on the strip of FIG. 7 might be in order. Referring back to FIG. 2 and 3, it will be seen that the output from terminal II of converter 4, which has the low voltage on it, could be coupled to the conductor 16 of FIG. 7. The command transmitters 2 would then be coupled across the conductor 16 and each of the conductors 15. The conductors 15 would then be returned to two separate input terminals 22 of converter 4 to control two separate switching devices 3. The adhesive backing on the strips makes them particularly susceptical to being mounted on walls. They may be mounted directly on the plaster or may even be mounted over wall paper. By making the plastic materials translucent an attractive looking installation will result. The command transmitters may be coupled to the strips 5 by pressing them or cementing them together or through the use of a connector such as that described in connection with FIG. 8. Similarly, sections of the strips may be coupled together in like manner. The command transmitter will be of similar dimensions as the strips and may have the same type of adhesive backing to permit easy attachment to the wall.

Figure 8:
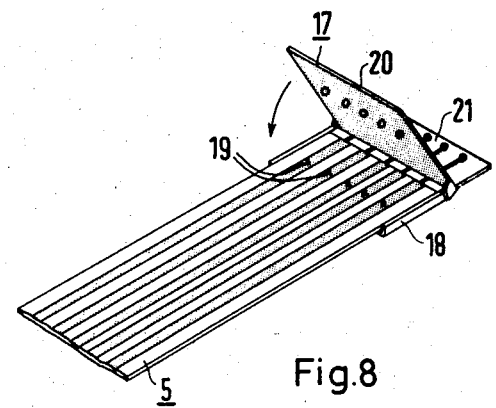
FIG. 8 is a perspective view showing a quick-connect terminal for the strip conductors of FIGS. 5, 6 and 7.

FIG. 8 shows a quick connect terminal for terminating the strips 5 or connecting the strips together or to a command transmitter. The lower part 18 of the terminal designated generally as 17 will contain a plurality of spikes which are aligned with the conductors in the strip 5. These spikes 19 will be electrically connected either to a terminal output 21 as shown or to another spike 19 similarly arranged on the other side to permit connecting another strip 5. The upper part 20 is mounted in a spring fashion to the base 18 of the quick connect terminal 17 such that it will snap down over the spikes 19 and hold the strip 5 in place. Such connectors are known in the art and are commercially available to couple available strip connectors.

The ease of installation and the time and money savings achieved by using the strips 5 is evident. Not only is the need for the making of holes for boxes and running wires behind walls eliminated, but, through the use of the quick connect terminals, etc. the stripping, and connecting normally associated with wiring installations is eliminated, not to mention the reduction in cost over using a high gauge expensive copper wire for all the wiring runs.

Figures 9, 11:
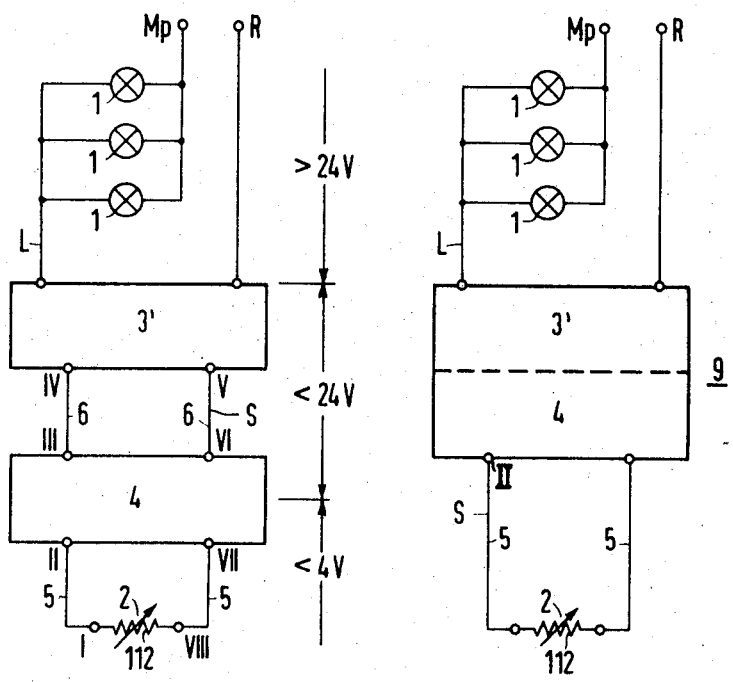
FIG. 9 is a block diagram illustrating an embodiment of the present invention wherein a potentiometer control is used.
FIG. 11 is a block diagram showing the converter and the switching mechanism of FIG. 9 combined in a single unit.

FIG. 9 illustrates the control of loads 1, such as lighting fixtures, where it is desired to provide variable control via control means 2, for example, for dimming lighting in residences and commercial installations. Operation is essentially the same as described above with the exception that the unit 3' is a control device, preferably one that works on the phase angle principle, for controlling the voltage or power provided to loads 1. Such control circuits are well known in the art and may comprise, for example, silicon controlled rectifier circuits, etc. A number of such circuits are described in the General Electric SCR manual, 4th Edition, 1967. Also shown therein are various triac circuits which may be used in the switching embodiments described above. In the embodiment of FIG. 9, the command transmitter 2 will comprise a potentiometer 112, preferably a flat sliding type potentiometer. (Use may also be made of the types of devices described above, i.e. mechanical to electrical, inductive, capacitive, and contacting switches either alone or with other control circuits.

Such arrangements relate to specific design requirements and objectives and are well within the capability of those skilled in the art.) Potentiometer 112 will be coupled over the flat strip lines 5 to the converter 4 as described above. In the converter 4, the voltage from the potentiometer 112 will be amplified to provide outputs on lines 6. For example, if 4 volts is the maximum voltage provided to the potentiometer 112 and 24 volts the outpu of the converter 4, the converter will have a gain of 6. Thus, if the potentiometer is set to provide a return voltage of 2 volts, the corresponding output on line 6 is 12 volts. This output is provided to the control device 3' where it is used to control the voltage or power provided to the loads 1. The AC power to the loads 1 is provided from the terminals MP and R. Terminal MP is coupled directly to one side of the loads 1. The terminal R will be coupled through a control device and then over a line L to the other side of the loads 1. The control device may, for example, be a silicon controlled rectifier circuit in which the voltage on the lines 6 controls the firing point of the SCR and thus the portion of the AC wave form which is provided during each cycle to the loads.

Figure 10:
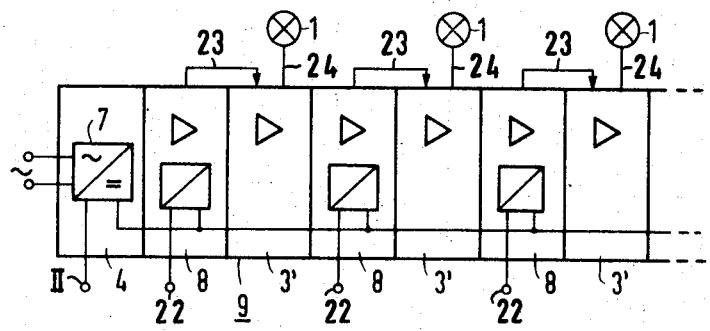
FIG. 10 is a block diagram illustrating the converter of FIG. 9.

As previously mentioned, it is desirable to combine the converter 4 and switching or control device 3 or 3' into a single installation which may be mounted in the distribution box. This arrangement is illustrated by FIGS. 10 and 11. On both FIGS. there is shown a module indicated collectively as 9. As shown on FIG. 10, this unit comprises a plurality of modules of which there is a single power supply 7, such as that described in connection with FIG. 3, and a plurality of converter units 8 and control units 3', arranged in pairs, along with the power supply 7. Each of the units will be constructed in modular form such as shown on FIG. 4 with connectors provided so that they may be connected together into a single unit of a size and shape to conveniently fit in a distribution box. The low control voltage will be provided out of the power supply 7 to a plurality of control transmitters 2 such as a potentiometer 112 or a switching device of the types described above. The signal will be returned over the lines 5 to the input terminals 22, and then into the respective converter modules 8. From the modules 8, after being amplified, the signal will be provided, over lines 23 to the respective control modules 3'. It should be noted that, although each of the modules in FIG. 10 is shown as a 3' or control module, they may equally well be switching modules 3 and in most installations, some of each will be present. The required switching or control operation is provided in the module 3 or 3' which then supplies the line voltage or a function thereof on lines 24 to the loads 1.

This arrangement for a single potentiometer 112 controlling a plurality of lamps 1 is shown on FIG. 11. As shown thereon, the control module 3 and the converter 4 are combined into a single unit 9 which is connected in series across the line terminals MP and R with the loads 1. An output on the line S from terminal II is provided through the potentiometer 112 and returned to the unit 9 where it is amplified and used to control the power level supplied to the loads 1 in the manner described above.

Thus, an improved lighting control circuit which uses extremely low voltages at the switch or control transmitter, thereby avoiding expensive installation costs, fire and shock hazards, and other disadvantageous of the prior art, and in which the conductors are flat conductors mounted directly to the building walls has been shown. Although specific embodiments have been shown and described it will be obvious to those skilled in the art that various modifications may be made without departing from the spirit of the invention which is intended to be limited solely by the appended claims.

What is claimed is:

1. Apparatus to permit an operator within a building to remotely switch an electrical load device installed in the building comprising:
   a. a low voltage source;
   b. at least one command transmitter having said low voltage as an input and providing, when operated, one of said low voltage and a portion of said low voltage as an output;
   c. amplifying means having as an input the output of said command transmitter and providing an amplified output at an intermediate voltage; and
   d. means to couple the load to a line voltage, said means being responsive to the output of said amplifying means, whereby the portions of the circuit with which an operator has contact will be low voltage, low power circuits and may therefore be constructed using thin components and need not be mounted within the walls.

2. The invention according to claim 1 wherein said low voltage is less than 4 volts, said intermediate voltage less than 24 volts and said line voltage over 24 volts, said command transmitter is made in a flat shape and is externally attached to a wall and said command transmitter is coupled to said voltage source and said amplifying means via a strip line mounted to the wall externally.

3. The invention according to claim 2 wherein said command transmitter is adapted to provide a pulse output when energized and said load coupling means comprise a switching device adapted to switch on in response to a pulse input.

4. The invention according to claim 3 wherein said load coupling means includes a power semiconductor for switching the load.

5. The invention according to claim 4 wherein said semiconductor is a triac.

6. The invention according to claim 3 wherein said command transmitter is a mechanical-electrical energy converter.

7. The invention according to claim 6 wherein said energy converter consists of one of the group of Hall effect transducers, field plates and piezoelectric crystals.

8. The invention according to claim 3 wherein said command transmitter is one of a capacitive and inductive transmitter.

9. The invention according to claim 3 wherein said command transmitter comprises switch contacts.

10. The invention according to claim 2 wherein said low voltage source comprises a power supply in modular form which is assembled with at least one amplifying means into a single converter package.

11. The invention according to claim 10 wherein said converter and said load coupling means are combined in a single structural unit.

12. The invention according to claim 11 wherein said single unit is so shaped and provided with contacts for insertion in and coupling to the busses in a distribution box.

13. The invention according to claim 2 wherein said command transmitter and said stripline are adapted to permit coupling them by pressure.

14. The invention according to claim 2 wherein said stripline is made of one of transparent and colored material.

15. The invention according to claim 2 wherein said striplines are coupled to terminal and junction points via flat quick-connect terminals.

16. The invention according to claim 2 wherein said command transmitter comprises means adjustable to provide a percentage of said low voltages as an output and said load coupling means comprise means to provide an average voltage to said load which is proportional to the voltage input to said load coupling means.

17. The invention according to claim 16 wherein said load coupling means includes a device which will fire at an electrical angle proportional to the input voltage.

18. The invention according to claim 16 wherein said command transmitter comprises a flat sliding potentiometer mounted to the wall.

19. The invention according to claim 16 wherein said command transmitter is selected from the group consisting of mechanical-electrical energy converters, inductive transmitters, capacitive transmitters, and switch contacts.

* * * * *